United States Patent
Wu et al.

(10) Patent No.: US 12,411,632 B2
(45) Date of Patent: Sep. 9, 2025

(54) AUTONOMOUS EDGE COMPUTING SYSTEM MANAGEMENT

(71) Applicant: Dell Products L.P., Round Rock, TX (US)

(72) Inventors: Xiaojun Wu, Shanghai (CN); Haijun Zhong, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/162,339

(22) Filed: Jan. 31, 2023

(65) Prior Publication Data

US 2024/0256172 A1    Aug. 1, 2024

(51) Int. Cl.
*G06F 3/06*     (2006.01)
*G06F 9/455*    (2018.01)

(52) U.S. Cl.
CPC .......... *G06F 3/0655* (2013.01); *G06F 3/0604* (2013.01); *G06F 3/067* (2013.01); *G06F 9/45558* (2013.01)

(58) Field of Classification Search
CPC ...... G06F 3/0655; G06F 3/0604; G06F 3/067; G06F 9/45558
See application file for complete search history.

(56) References Cited

U.S. PATENT DOCUMENTS

| | | | |
|---|---|---|---|
| 10,108,605 B1 * | 10/2018 | Leighton | G06F 16/34 |
| 2002/0152277 A1 * | 10/2002 | Drees | H04L 41/046 |
| | | | 709/208 |
| 2012/0233299 A1 * | 9/2012 | Attanasio | H04L 41/0843 |
| | | | 709/220 |
| 2018/0097845 A1 * | 4/2018 | Chen | H04L 67/1042 |
| 2019/0121882 A1 * | 4/2019 | Bortnikov | G06F 16/2228 |
| 2022/0214815 A1 * | 7/2022 | BenHanokh | G06F 3/0617 |
| 2022/0391277 A1 * | 12/2022 | Laster | G06F 11/0757 |
| 2023/0305905 A1 * | 9/2023 | Chen | G06F 9/5083 |

* cited by examiner

*Primary Examiner* — Edward J Dudek, Jr.
(74) *Attorney, Agent, or Firm* — Jackson Walker L.L.P.

(57) ABSTRACT

An information handling system cluster may include a plurality of nodes, each node including at least one processor and a memory. A particular node of the information handling system cluster may be configured to: receive management instructions from a central management system; cause the management instructions to be executed by other nodes of the information handling system cluster; receive result information from the other nodes; and transmit the result information to the central management system.

15 Claims, 2 Drawing Sheets

AUTONOMOUS EDGE COMPUTING SYSTEM MANAGEMENT

TECHNICAL FIELD

The present disclosure relates in general to information handling systems, and more particularly to techniques for management of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In many HCI implementations, an administrator may use a centralized management system (e.g., a cloud-based system, or in general any information handling system communicatively coupled to the HCI nodes via a network). The centralized management system may communicate with HCI nodes individually to perform various management tasks such as provisioning, monitoring, upgrading, etc. However, in an edge computing scenario, there may be a large number of edge computing systems, and so the use of such a centralized management system to monitor and configure the edge nodes may consume an excessive amount of computing resources and cause individual management tasks to take an excessive amount of time. Accordingly, embodiments of this disclosure provide techniques for managing a large quantity of information handling systems such as edge computing systems in an HCI system in a way that reduces the computing costs, as well as the time required to perform management tasks.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system cluster may include a plurality of nodes, each node including at least one processor and a memory. A particular node of the information handling system cluster may be configured to: receive management instructions from a central management system; cause the management instructions to be executed by other nodes of the information handling system cluster; receive result information from the other nodes; and transmit the result information to the central management system.

In accordance with these and other embodiments of the present disclosure, a method may include, in an information handling system cluster including a plurality of nodes, each node including at least one processor and a memory, a particular node of the information handling system cluster receiving management instructions from a central management system; the particular node causing the management instructions to be executed by other nodes of the information handling system cluster; the particular node receiving result information from the other nodes; and the particular node transmitting the result information to the central management system.

In accordance with these and other embodiments of the present disclosure, an article of manufacture may include a non-transitory, computer-readable medium having computer-executable instructions thereon that are executable by a processor of a particular node of an information handling system cluster for: receiving management instructions from a central management system; causing the management instructions to be executed by other nodes of the information handling system cluster; receiving result information from the other nodes; and transmitting the result information to the central management system.

Technical advantages of the present disclosure may be readily apparent to one skilled in the art from the figures, description and claims included herein. The objects and advantages of the embodiments will be realized and achieved at least by the elements, features, and combinations at particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
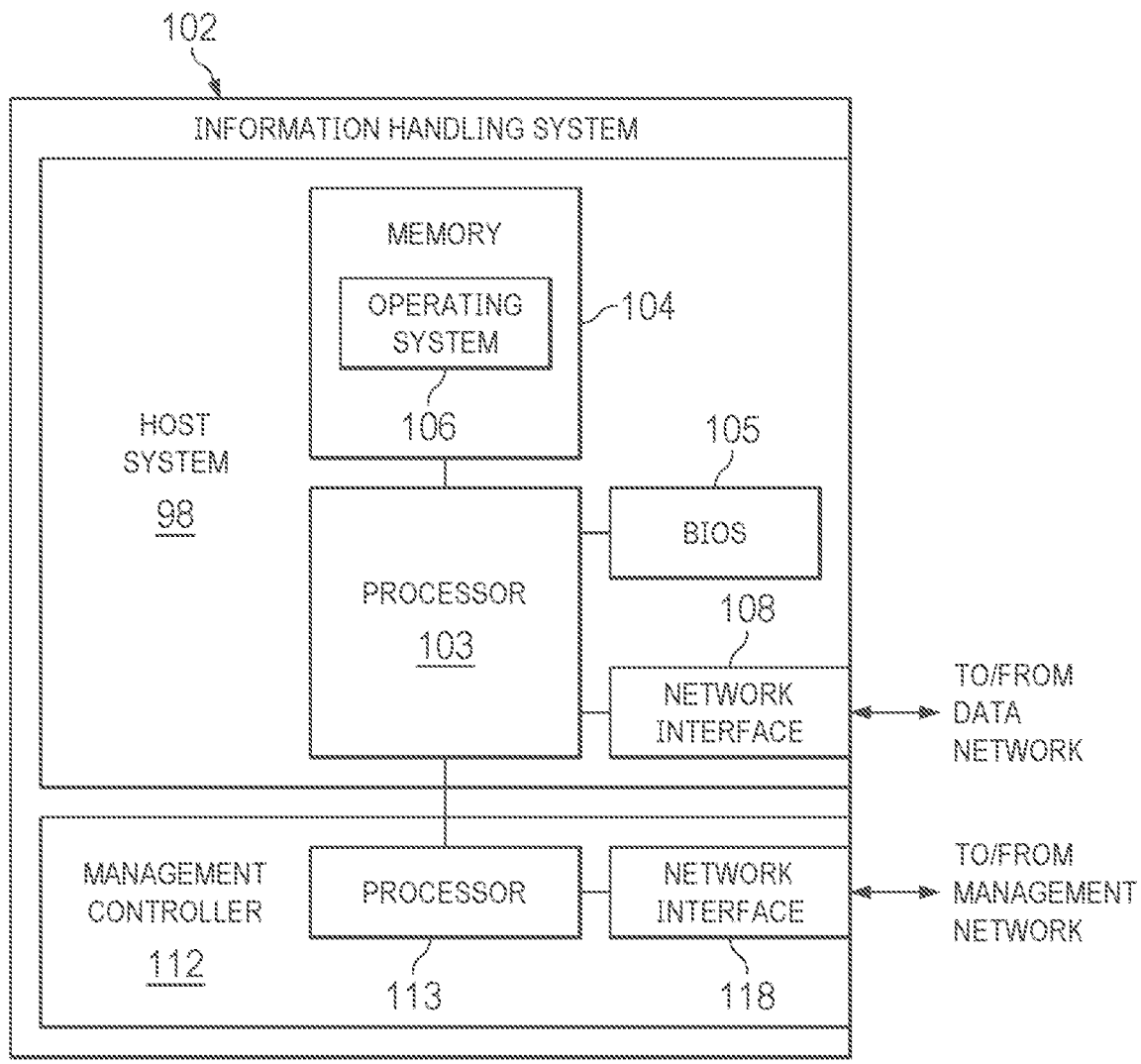
FIG. 1 illustrates a block diagram of an example information handling system, in accordance with embodiments of the present disclosure.
Figure 2:
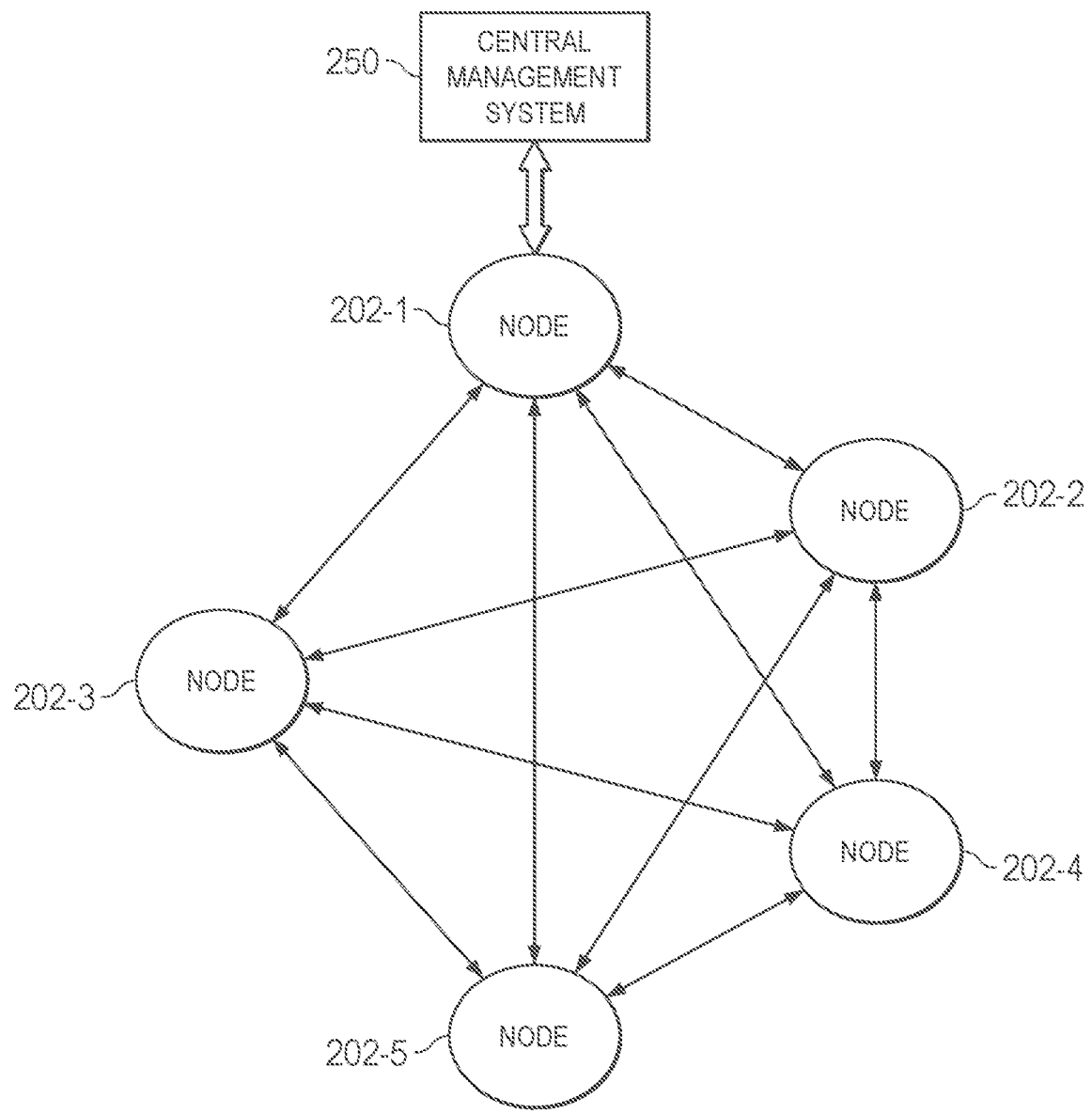
FIG. 2 illustrates a block diagram of autonomous management of information handling systems, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and in may vary size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media storing for data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may executable comprise any program of instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in management of information handling systems 102 (e.g., edge nodes). It should be noted that while the scenario of an edge deployment is discussed in detail herein for the sake of concreteness, other embodiments are also specifically contemplated within the scope of this disclosure.

In particular, embodiments may employ distributed autonomous edge nodes to assist the centralized management system in performing its management tasks. The centralized management system may communicate with a subset of the edge nodes (e.g., one or more of the edge nodes at each edge deployment) instead of communicating directly with every edge node. Members of this subset may then autonomously communicate with their "neighbors" (e.g., other systems within the same edge deployment) to carry out the management tasks.

By performing status checks and/or distributing management instructions (e.g., configuration changes, updates, etc.) with their neighbors autonomously, the subset of the edge nodes may synchronize configurations across the whole edge deployment and/or the whole HCI system without the need for the centralized management system to communicate directly with every edge node.

In one embodiment, the specific number of neighbors that should be managed by a given edge node in the subset can be calculated by a mathematic model to fit the system's design requirements. In other embodiments, the number of neighbors managed by a given edge node in the subset may be hard-coded or provided as a variable that an administrator may set.

Embodiments may provide thus distributed system management for a large number of edge computing systems. Health checks may be carried out by neighbors in one or more large edge deployments, avoiding the necessity for each edge node to be checked directly by the centralized management system. Configuration changes and updates may also be synchronized between neighbors in large edge deployments, avoiding the necessity for such changes to be provided directly by the centralized management system.

Turning now to FIG. 2, an example architecture is management of information handling shown for autonomous systems. As 202-1 shown, edge nodes through 202-5 (collectively, nodes 202) are communicatively coupled to one another (e.g., via a local edge deployment network). They may also be communicatively coupled to central management system 250 (e.g., via the internet).

In one embodiment, central management system 250 may communicate directly with node 202-1 to perform monitoring and management tasks. The other nodes 202 may communicate (directly or indirectly) with node 202-1, which may act as a portal for status and management information. For example, the other nodes may transmit status information to node 202-1, which may aggregate the information and pass it along to central management system 250. Updates and other management instructions may likewise be sent from central management system 250 to node 202-1, which may distribute them to the other nodes 202.

The communication between node 202-1 and the other nodes 202 may be either direct or indirect. For example, node 202-4 may communicate directly with node 202-1, or it may communicate with node 202-2, which may pass information along to node 202-1.

In one embodiment, each communication may include a time stamp associated therewith to indicate the time of origination. In this way, nodes 202 may determine the order in which instructions were issued, such that later instructions may supersede earlier instructions, etc. Time stamps may further be employed to reduce unnecessary duplication of communications. For example, if one node has broadcast a message to its neighbor nodes, and one of those nodes has already transmitted the message to central management system 250 at a particular time, then the other nodes need not retransmit the message at a later time.

In one embodiment, the arrangement of FIG. 2 may allow neighbors to perform health checks autonomously on one another in the event that communication is lost between central management system 250 and nodes 202. For example, if communication is interrupted between central management system 250 and node 202-1, then central management system 250 may contact node 202-5 and instruct it to perform the functionality previously handled by node 202-1. For example, node 202-5 may then perform health checks, heartbeat monitoring, and other tasks with regard to itself and the other nodes 202, reporting the results to central management system 250.

In one embodiment, this may be triggered based on a lack of communications between node 202-1 and central management system 250 that lasts more than a threshold amount of time. The threshold may be calculated based on a mathematic model that takes into account the characteristics of the node deployment. In other embodiments, the threshold may be hard-coded or provided as a variable that an administrator may set. In one implementation, the communication frequency and timing may incorporate a random or pseudorandom element, such that communications are staggered to avoid overwhelming the network infrastructure.

This disclosure encompasses all changes, substitutions, variations, alterations, and modifications to the exemplary embodiments herein that a person having ordinary skill in the art would comprehend. Similarly, where appropriate, the appended claims encompass changes, substitutions, all variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system cluster comprising:
  a plurality of nodes, each node including at least one processor and a memory;
  wherein a particular node of the information handling system cluster is configured to:
  receive management instructions from a central management system, wherein the management instructions are executable to perform updating, monitoring, and/or changing a configuration setting of at least one component of each node of the plurality of nodes;
  cause the management instructions to be executed by other nodes of the information handling system cluster;
  receive result information from the other nodes; and
  transmit the result information to the central management system;
  wherein the management instructions have timestamps associated therewith, and wherein the other nodes of the information handling system cluster are configured to execute the management instructions such that management instructions having later timestamps supersede management instructions having earlier timestamps.

2. The information handling system cluster of claim 1, wherein the information handling system cluster is a hyper-converged infrastructure (HCI) system.

3. The information handling system cluster of claim 2, wherein the plurality of nodes are elements of an edge deployment of the HCI system.

4. The information handling system cluster of claim 1, wherein the other nodes are not in communication with the centralized management system.

5. The information handling system cluster of claim 1, wherein the particular node is further configured to perform health monitoring of the other nodes and transmit health monitoring results to the central management system.

6. A method comprising:
  in an information handling system cluster including a plurality of nodes, each node including at least one processor and a memory, a particular node of the information handling system cluster receiving management instructions from a central management system, wherein the management instructions are executable to perform updating, monitoring, and/or changing a configuration setting of at least one component of each node of the plurality of nodes;
  the particular node causing the management instructions to be executed by other nodes of the information handling system cluster;
  the particular node receiving result information from the other nodes; and
  the particular node transmitting the result information to the central management system;
  wherein the management instructions have timestamps associated therewith, and wherein the other nodes of the information handling system cluster are configured to execute the management instructions such that management instructions having later timestamps supersede management instructions having earlier timestamps.

7. The method of claim 6, wherein the information handling system cluster is a hyper-converged infrastructure (HCI) system.

8. The method of claim 7, wherein the plurality of nodes are elements of an edge deployment of the HCI system.

9. The method of claim 6, wherein the other nodes are not in communication with the centralized management system.

10. The method of claim 6, wherein the particular node is further configured to perform health monitoring of the other nodes and transmit health monitoring results to the central management system.

11. An article of manufacture comprising a non-transitory, computer-readable medium having computer-executable instructions thereon that are executable by a processor of a particular node of an information handling system cluster for:

receiving management instructions from a central management system, wherein the management instructions are executable to perform updating, monitoring, and/or changing a configuration setting of at least one component of each node of the plurality of nodes;

causing the management instructions to be executed by other nodes of the information handling system cluster;

receiving result information from the other nodes; and transmitting the result information to the central management system;

wherein the management instructions have timestamps associated therewith, and wherein the other nodes of the information handling system cluster are configured to execute the management instructions such that management instructions having later timestamps supersede management instructions having earlier timestamps.

12. The article of claim 11, wherein the information handling system cluster is a hyper-converged infrastructure (HCI) system.

13. The article of claim 12, wherein the plurality of nodes are elements of an edge deployment of the HCI system.

14. The article of claim 11, wherein the other nodes are not in communication with the centralized management system.

15. The article of claim 11, wherein the particular node is further configured to perform health monitoring of the other nodes and transmit health monitoring results to the central management system.

* * * * *